June 4, 1929.  L. R. OAKES  1,716,239
POULTRY WATERING TROUGH
Filed Aug. 30, 1926
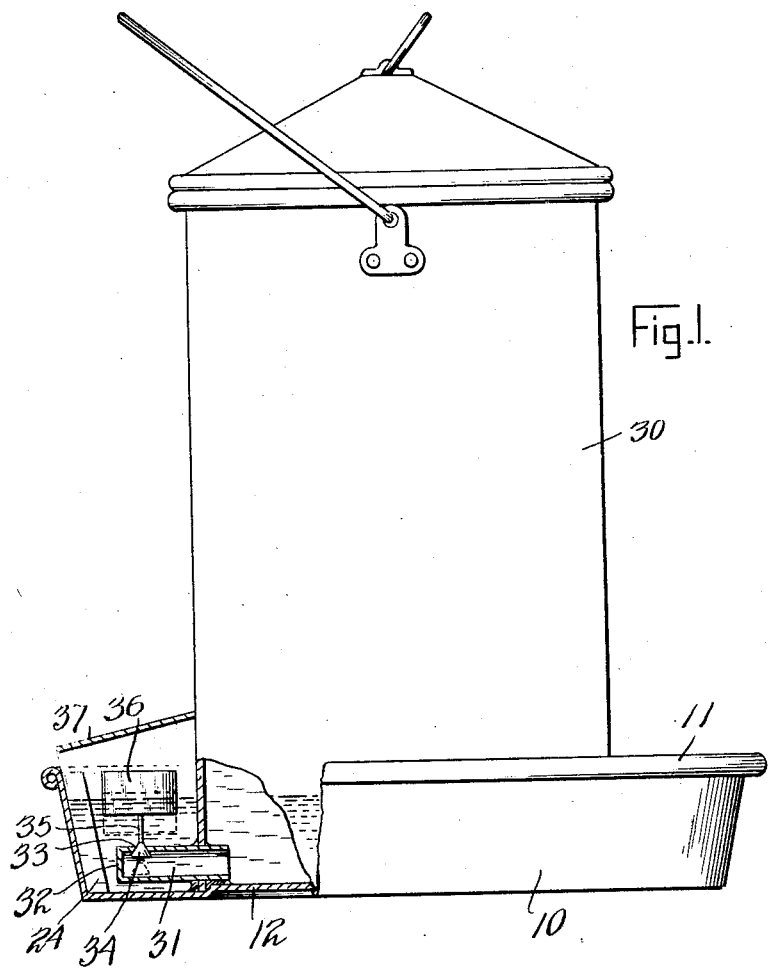
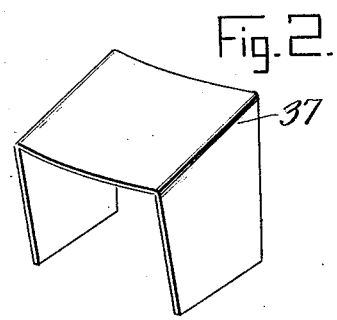
Inventor
Lucian R. Oakes
By
Attorney Patented June 4, 1929.

1,716,239

UNITED STATES PATENT OFFICE.

LUCIAN R. OAKES, OF TIPTON, INDIANA, ASSIGNOR TO THE OAKES MANUFACTURING COMPANY, OF TIPTON, INDIANA, A CORPORATION OF INDIANA.

POULTRY WATERING TROUGH.

Application filed August 30, 1926. Serial No. 132,619.

My said invention relates to improvements in poultry watering troughs and it is an object of the invention to provide a device of this character having a shallow trough with a reservoir or tank for reserve liquid with improved means for controlling the supply of the liquid from the reservoir to the trough.

Referring to the accompanying drawings which are made a part hereof and on which similar reference characters indicate similar parts, Figure 1 is a side elevation partly in section illustrating the application of my invention, and Figure 2, a perspective of a cover for parts of the device.

In the drawings reference character 10 indicates a shallow pan or container preferably circular in shape and having its upper edge rolled over at 11 providing a reinforcing rim. The pan 10 may also be provided with a central upset portion 12 about which the lower extremity of a sleeve arranged to form a fluid reservoir or tank 30 adapted to contain a quantity of fluid to be dispensed to poultry, animals or the like, is adapted to be soldered, or secured in any other desired manner, in upright position. The reservoir 30 may be of any desired shape or construction, but preferably conforms in general outline to the circular pan 10 to which it is affixed.

A short nipple or pipe 31 is soldered or otherwise secured in an opening through the wall of the reservoir adjacent the bottom of the same and the end of the pipe 31 is closed at 32. A small opening 33 is provided through the upper portion of the pipe and a valve 34 is mounted on the inside of the pipe with the stem 35 projecting through said opening 33 and attached to a cork 36. When the reservoir 30 is filled with liquid such liquid will pass into the pipe 31 and out through the opening 33 therein and into the chamber or trough formed between the reservoir and the sides of the pan until the float is buoyed up and the valve closes the opening stopping the flow of liquid. When the surface level of the liquid in the trough drops below a certain amount the float will lower the valve and permit the liquid in the reservoir to flow out until it reaches the desired level whereupon the float will operate to close the valve.

A substantially U-shaped guard consisting of a body or casing 37 is provided for protecting the float valve structure from injury in order that it will function properly at all times. The front and rear edges of the casing are intermediate portion of the casing are shaped to conform to the curved surfaces of the pan and reservoir which are in the present instant similarly curved. The casing 37 is held in position by grooved members 24 secured in upright position to the side of the pan 10 in which its legs are inserted.

My invention comprises few and simple parts, there being a pan, a sleeve or pipe secured therein and a valve for controlling the flow of liquid from the reservoir through said sleeve into said pan. The guard and top are desirable for insuring the operation of the valve and for keeping foreign matter out of the reservoir respectively.

It will be obvious to those skilled in the art that various changes may be made in my device without departing from the spirit of my invention, and I, therefore, do not limit myself to what is shown in the drawings and described in the specification but only as indicated in the appended claim.

Having thus fully described my said invention, what I claim as new and desire to secure by Letters Patent, is:

A poultry watering trough comprising a shallow pan open at its top and having its upper edge rolled over to form a reinforcing rim, said pan having its central portion struck up and forming a circular ridge, an upright sleeve in said pan having its lower ends extending over said ridge and forming an annular drinking trough about the sleeve, a pipe extending through the lower extremity of the sleeve and forming communication with the interior of the same and projecting outwardly into the trough, said pipe having its outer end closed and having an opening in its upper portion, a valve stem extending through said opening, a valve mounted on the inner end of said stem, a float mounted on the outer end of said stem, said valve and float being held in fixed spaced relation, a guide on said trough at each side of the valve and a removable guard for the valve having spaced legs slidable in said guides and having its top portion sloping downwardly from the sleeve and with its edges adjacent the pan and sleeve shaped to agree in conformation therewith, substantially as set forth.

In witness whereof, I have hereunto set my hand at Tipton, Indiana, this 19th day of July, A. D. nineteen hundred and twenty-six.

LUCIAN R. OAKES.